United States Patent
Salvi et al.

(10) Patent No.: US 9,426,258 B1
(45) Date of Patent: Aug. 23, 2016

(54) EXPRESSION BASED DECLARATIVE DATA SERVICE EXECUTION CHAINING

(71) Applicant: EMC Corporation, Hopkinton, MA (US)

(72) Inventors: Roshan Prakash Salvi, Bangalore (IN); Ramkumar Ganesan, Bangalore (IN); Sachin G. Totale, Bangalore (IN); Swati Bhatia, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 14/171,515

(22) Filed: Feb. 3, 2014

(51) Int. Cl.
*G06F 15/16* (2006.01)
*H04L 29/06* (2006.01)

(52) U.S. Cl.
CPC ..................... *H04L 67/42* (2013.01)

(58) Field of Classification Search
USPC .......................... 709/226, 203, 200
See application file for complete search history.

(56) References Cited

U.S. PATENT DOCUMENTS

| | | | | |
|---|---|---|---|---|
| 2004/0243557 | A1* | 12/2004 | Broder | G06F 17/2785 |
| 2009/0157627 | A1* | 6/2009 | Arthursson | G06F 9/45504 |

\* cited by examiner

*Primary Examiner* — El Hadji Sall
(74) *Attorney, Agent, or Firm* — Van Pelt, Yi & James LLP

(57) ABSTRACT

Expression based declarative data service execution chaining is disclosed. In various embodiments, an indication is received that a first data service has returned a result indicating the first data service has been invoked successfully. An expression is evaluated, based at least in part on the result. A second data service is invoked based at least in part on an outcome of the evaluation of the expression.

17 Claims, 7 Drawing Sheets

EXPRESSION BASED DECLARATIVE DATA SERVICE EXECUTION CHAINING

BACKGROUND OF THE INVENTION

Data services may be used to enable applications to fetch data from a backend server, submit data/initiate actions/change state, or invoke specialized business logic to be performed in a backend server.

In traditional data service chaining techniques, the sequence of execution of data services in a chain is programmatically predefined or configured. As a result, typically the sequence of data service invocation cannot be determined dynamically at runtime. In prior approaches, a data service can get executed based on the output of another data service, but typically this is a point to point triggering. Typically, there was also no way to apply a condition based on which the triggering of a subsequent data service can happen, or not happen, depending on whether the condition is satisfied.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details.

Expression based declarative data service execution chaining is disclosed. In various embodiments, a definition of conditions under which the output of a first data service may trigger invocation of one or more other data services, and/or the manner of invocation (e.g., input or argument provided to the data service) is received in a declarative form, e.g., via a developer user interface. The definition may take or be transformed into the form of one or more expressions to be evaluated at runtime. The expression(s) may indicate one or more conditions under which a subsequent data service is to be invoked, for example. In various embodiments, application code to provide expression-based data service execution chaining is generated programmatically, e.g., based at least in part on the definition. Expression may be evaluated programmatically at runtime to determine, for example, whether to invoke a (further) data service, which data service to invoke (next), and/or a manner in which a data service is to be invoked (e.g., a dynamically-determine value to be provided to the data service as an input). In various embodiments, an event infrastructure associated with an application user interface may be used to trigger invocation of a (next) data service in a chain.

Figure 1:
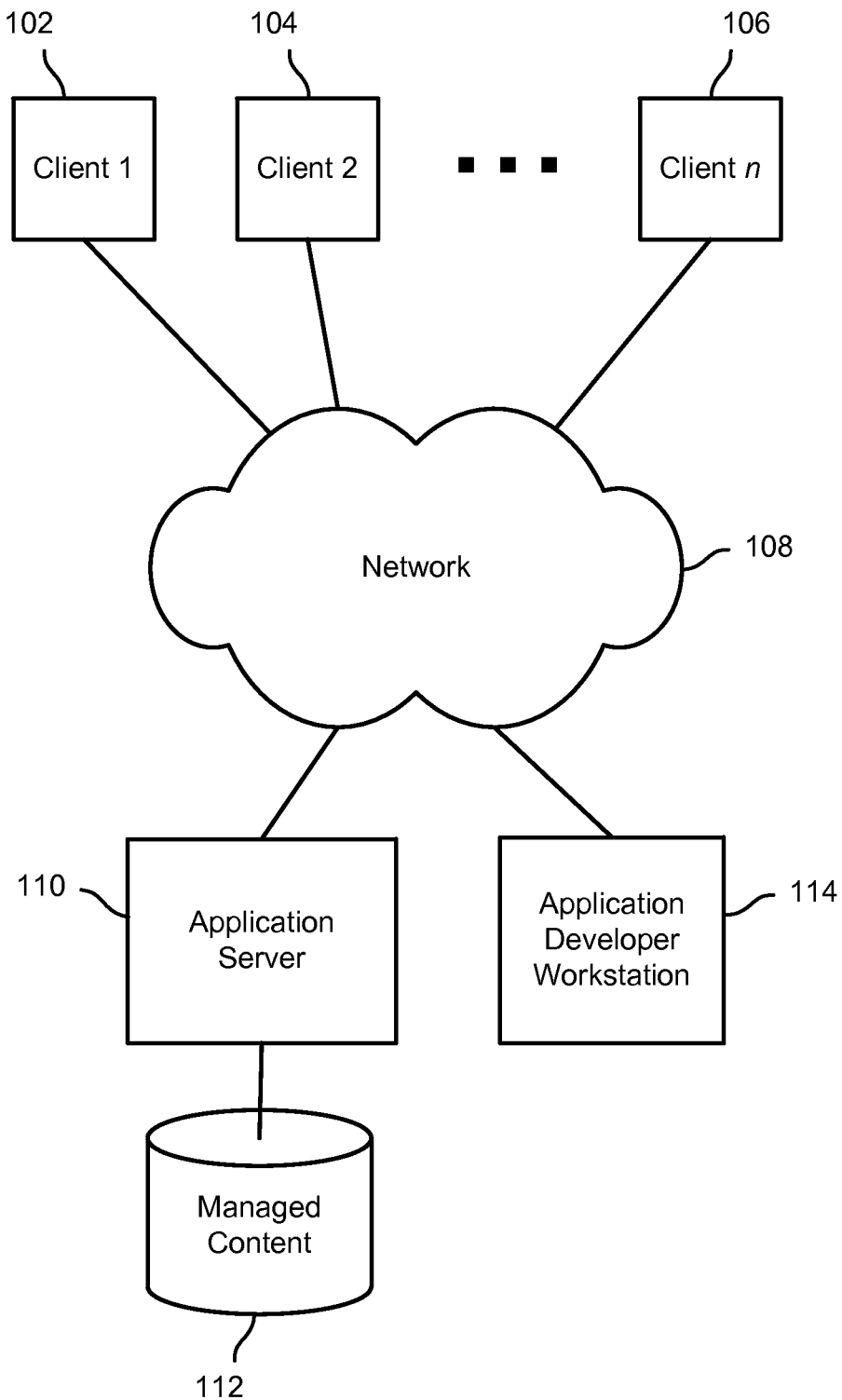
FIG. 1 is a block diagram illustrating an example embodiment of an application development system and environment.

FIG. 1 is a block diagram illustrating an example embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®. In other embodiments, platforms and components other than the EMC® offerings mentioned above may be used.

In various embodiments, a visual or other development tool interface to enable developers to define application user interface elements and/or other application components. In some embodiments, the developer user interface enables a developer to define one or more action elements to be included in one or more application user interface pages. Actions may be defined to invoke corresponding data services. The definitions may specify, e.g., declaratively, that a "success" event generated in response to receipt of a data service response from a first data service may trigger invocation of a second data service, and so on. Expressions may in various embodiments be specified to provide for conditional invocation of a (further) data service. The definitions are used in various embodiments to generate application user interface code which at runtime invokes a user interface event infrastructure, e.g., of a runtime or other environment comprising application server 110, to invoke data services, potentially in a chain, in accordance with the definitions.

Figure 2:
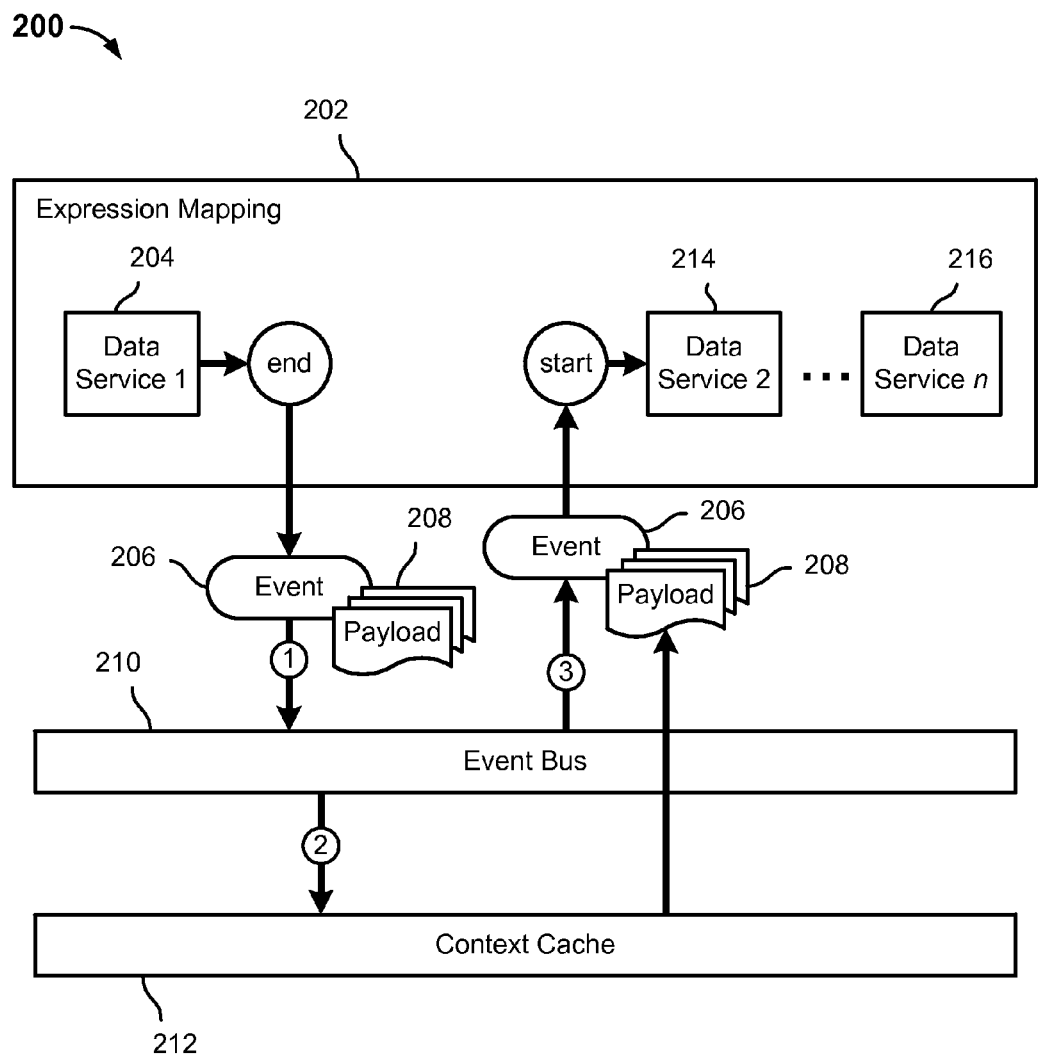
FIG. 2 is a block diagram illustrating an example embodiment of a system to provide expression based service execution chaining.

FIG. 2 is a block diagram illustrating an example embodiment of a system to provide expression based service execution chaining. In some embodiments, application code composed by a developer using a development tool, for example at an application developer workstation such as application developer workstation 114 of FIG. 1, may be downloaded by a client system (such as clients 102, 104, and 106 of FIG. 1) from an application server, such as application server 110 of FIG. 1, and executed in an application runtime environment running on the client system, such as application runtime environment 200 of FIG. 2. In the example shown in FIG. 2, application runtime environment 200 includes an expression mapping component 202 configured to provide expression based chaining of data service execution. In the example shown, a first data service 204 has been invoked and has returned a result, which has in this example resulted in an event 206 having an event payload 208 being published. In various embodiments, an action or other application user interface page element, e.g., one defined declaratively as described herein, may be configured to invoke a data service such as data service 204, for example in response to user input via the application user interface page. For example, entry by a user of a "customer name" and selection of a corresponding "submit" or "create" button may have resulted in the data service 204 being invoked. In this example, data service 204 may be configured to create a new backend "customer" or other "person" object based on the user input. Return of a "success" result from data service 204 in this example may cause the action element that invoked the service, or some other page element and/or application framework component, to generate the event 206, including payload 208. For example, the event 206 may include a "success" event, and the payload 208 may include a customer type (e.g., "gold" level) or other attribute associated with the newly-created customer object. In some embodiments, expression mapping component 202 may be configured to evaluate at application runtime one or more developer-defined expressions to determine dynamically at runtime whether and/or how to generate event 206 in response to receiving a success result from data service 204. For example, the expression may indicate one or more conditions under which event 206 will be published, and upon receipt of a result from data service 204 the event 206 either will or will not be published, depending on whether evaluation of the expression indicates the event 206 should be published in that instance. In some embodiments, an expression may be used to determine dynamically at runtime one of a plurality of events, or sets of one or more events, are to be published under given circumstances. For example, a different path of chained data service executions may be presented to a new customer determined to be eligible for "gold" status than one determined to be eligible only for "silver" status.

In the example shown in FIG. 2, the event 206 is published via an event bus 210, while associated event payload data 208 is store in a local data storage area, such as the "context cache" 212 shown in FIG. 2. The event 206 is consumed in this example by an action element or other element configured to invoke a second service 214 based on receipt of the event. For example, a second action element of an application user interface page may be configured to subscribe to receive "success" events published in response to successful invocation of a first data service, such as data service 204, e.g., to create a new customer object. For example, a second service, such as data service 214, may be invoked to create a related object, such as an address object.

In various embodiments, respective results from successively invoked data services each may prompt one or more other data services to be invoked, such as data services included in a plurality of available data services, represented in FIG. 2 by data services 204, 214, and 216. In various embodiments, branching and/or looping may be supported. For example, a first chain of data services may be invoked under a first developer-defined set of one or more circumstances, while a second branch (chain of data services) may be followed under a different set of conditions. Likewise, looping may be provided by causing a data service to be invoked in successive iterations, for example unless or until a condition defined by the developer has been met. In some embodiments, conditions may be determined to be satisfied or not by evaluating at runtime a developer-defined expression, e.g., using a component such as expression mapping component 202 of FIG. 2.

Figure 3:
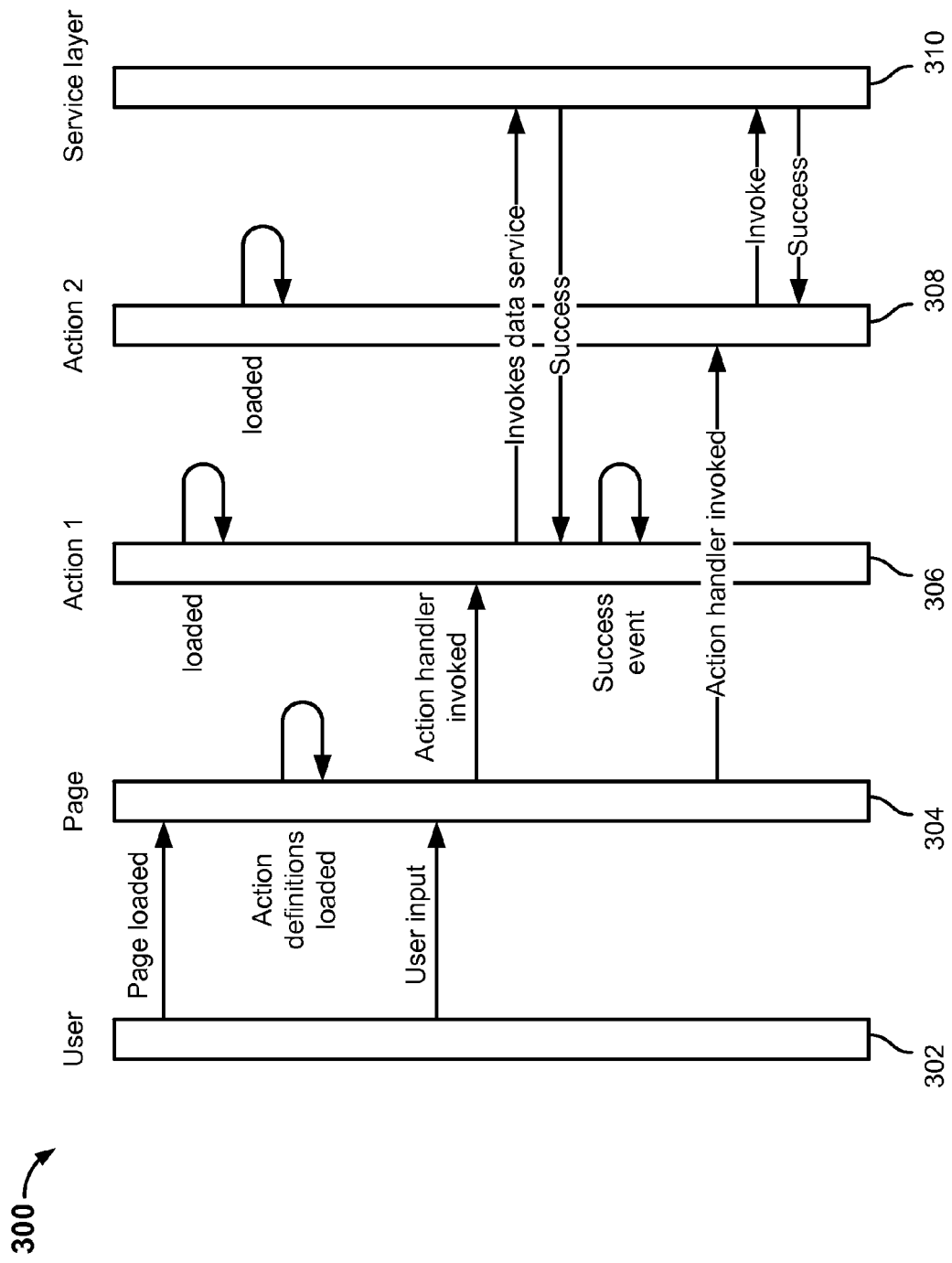
FIG. 3 is a sequence diagram illustrating an example embodiment of a system to provide expression based service execution chaining.

FIG. 3 is a sequence diagram illustrating an example embodiment of a system to provide expression based service execution chaining. In the example 300 shown, a user 302 has accessed an application user interface page 304, having an associated page infrastructure, for example by using a browser or other software to load the page 304. In some embodiments, the page 304 may include, or be associated with a page infrastructure that includes, an expression mapping module, such as expression mapping module 202 of FIG. 2. The page 304 in the example shown includes a first action element 306 and a second action element 308. Once the page 304 and action definitions associated with action elements 306 and 308 have been loaded, in the example shown the user 302 has provided a user input that causes the first action element 306 to be invoked, e.g., the user may have selected a button or other control. The user input results in an action handler associated with the first action element 306 to be invoked. In accordance with its corresponding action definition, in this example the first action element 306 invokes a first data (or other) service (not shown), by sending a request via a service layer 310. In this example, receipt of a successful result from invocation of the first data service results in a "success" event being published by the first action element 306, e.g., similarly to the event 206 published in response to successful invocation of data service 204 in the example shown in FIG. 2. In the example shown in FIG. 3, second action element 308 has subscribed to "success" events associated with successful invocation of the first data service by first action element 306, resulting in the second action element 308 being invoked, in response to the success event published by the first action element 306 (similarly to the data service 214 of FIG. 2 being invoked in response to receipt of the event 206, in the example shown in FIG. 2). The second action element 308 in turn invokes a second data service (not shown) via the service layer 310. In various embodiments, more actions and associated data services could be chained, and/or branching and/or looping may be provided.

Figure 4:
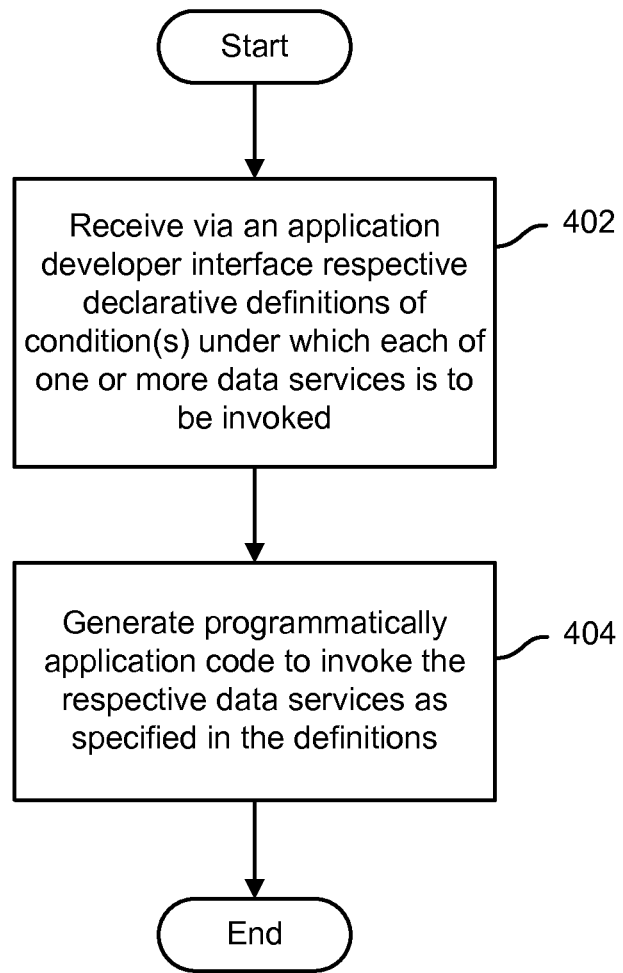
FIG. 4 is a flow chart illustrating an example embodiment of a process to develop an application that performs expression based service execution chaining.

FIG. 4 is a flow chart illustrating an example embodiment of a process to develop an application that performs expression based service execution chaining. In some embodiments, the process of FIG. 4 may be executed by an application development platform, such as a platform included or otherwise associated with application developer workstation 114 of FIG. 1. In the example shown, one or more declarative definitions are received, e.g., via an application developer tool user interface, of conditions under which each of one or more data services is to be invoked and/or conditions under which and/or the manner in which "success" events are to be published in response to successful invocation of each of one or more data services (402). The definitions are used to generate programmatically application code to invoke the respective data services and/or to publish "success" (or other) events in response to successful invocation of such services (404). For example, in various embodiments, application code to provide and include in application user interface pages one or more action elements, such as elements 306 and 308 of FIG. 3, may be generated and deployed to an application server, such as application server 110 of FIG. 1.

Figure 5:
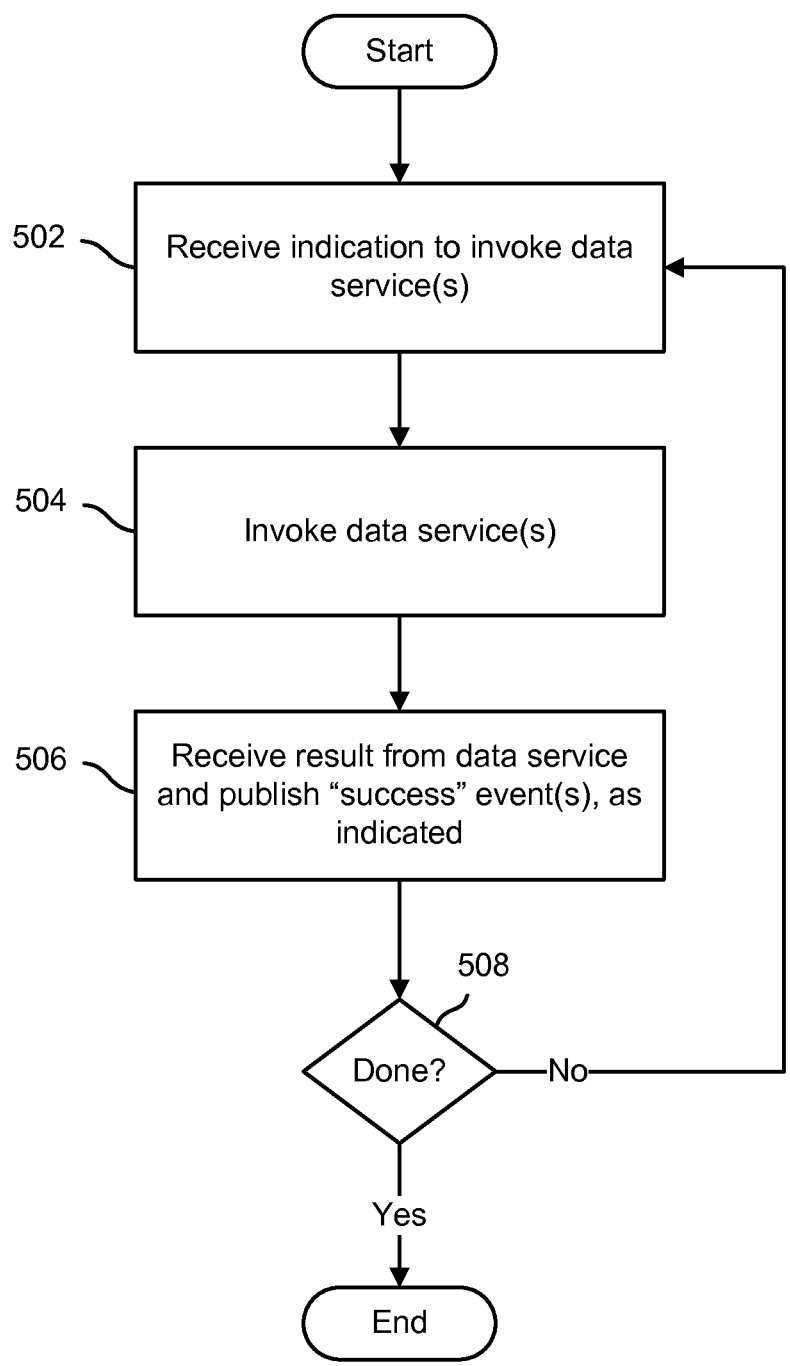
FIG. 5 is a flow chart illustrating an example embodiment of a process to perform expression based service execution chaining.

FIG. 5 is a flow chart illustrating an example embodiment of a process to perform expression based service execution chaining. In some embodiments, the process of FIG. 5 may be executed by a client system on which application code of a developer-composed application is running, such as clients 102, 104, and 106 of FIG. 1. In the example shown, an indication to invoke one or more data services is received (502). Example indications include without limitation a user input, such as selection of a button or other control, entry of text or other data in an application user interface input field, etc., and receipt of a "success" event, such as one generated in response to a previously-invoked data service to which a next data service is chained. The one or more data services are invoked (504). Respective results are received from the invoked data service(s), and one or more corresponding "success" events are published (506), e.g., as described above in connection with FIGS. 2 and 3. The process may continue through successive iterations of invoking chained data (or other) services, until no further chained services are to be invoked (508), for example, all data services defined by the developer to be in the chain have been performed, the user leaves the page with which the chain of data service executions is associated, etc.

Figure 6:
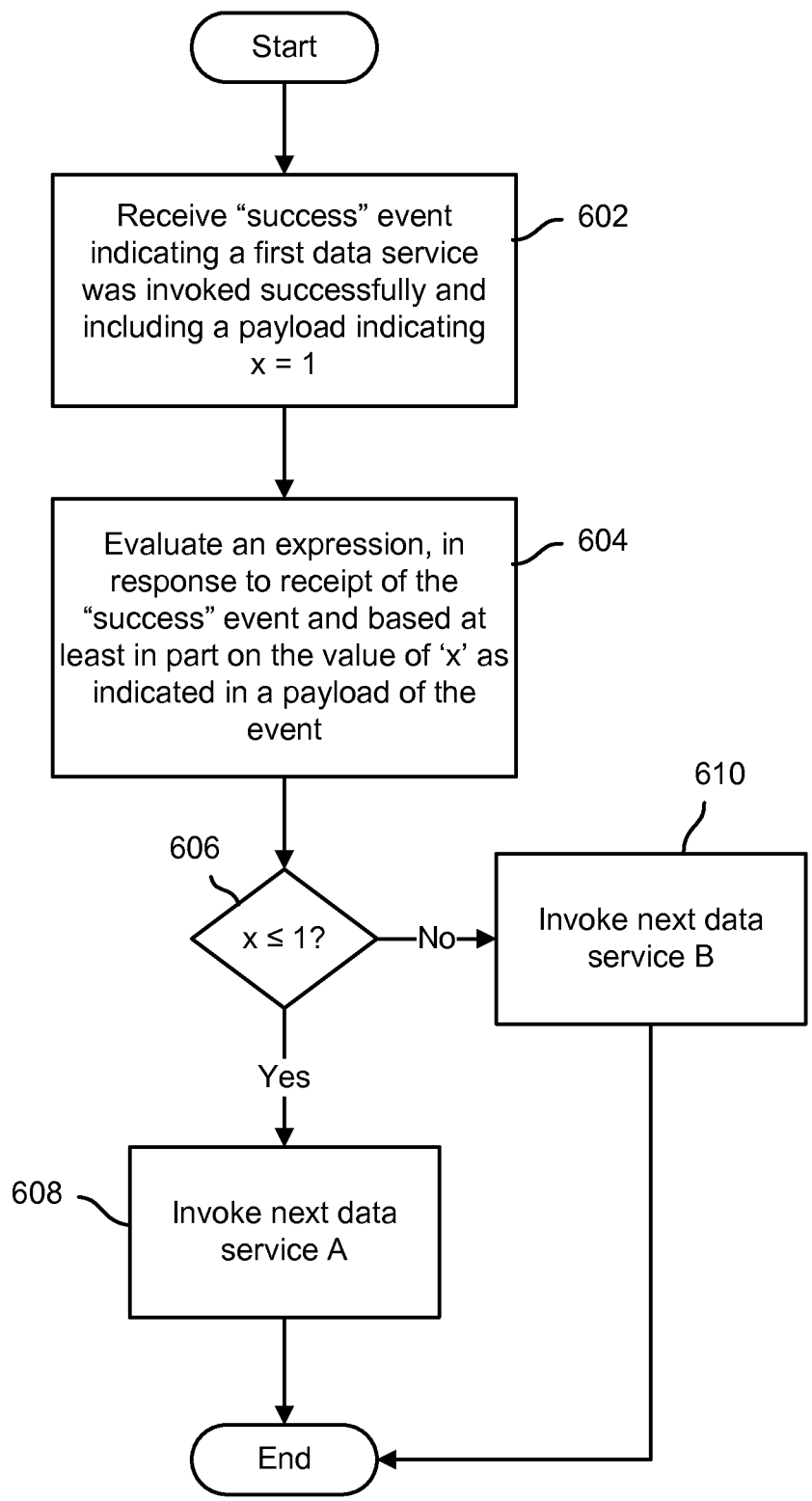
FIG. 6 is a flow chart illustrating an example embodiment of a process to perform expression based service execution chaining with dynamically determined branching.

FIG. 6 is a flow chart illustrating an example embodiment of a process to perform expression based service execution chaining with dynamically determined branching. In some embodiments, the process of FIG. 6 may be executed by a client system on which application code of a developer-composed application is running, such as clients 102, 104, and 106 of FIG. 1. In the example shown, a "success" event indicating that a first data service has been invoked successfully, and including a payload indicating that a value of an associated variable 'x' is currently x=1, is received (602). An expression is evaluated, in response to receipt of the "success" event and based at least in part on the payload indicating x=1 (604). In the example shown, the expression is "x≤1?" is used (606), but in other examples any expression defined by a developer may be evaluated. In this example, if x is determined to be less than or equal to 1 (606) a next service "A" is invoked next (608); but if x is determined not to be less than or equal to 1 (606) a next service "B" is invoked instead (610). Because in the example as shown x=1, in this case the next data service A would be invoked (606, 608). In this example, the data service to be invoked next, after execution of the "first data service" (602) is determined dynamically, at application runtime, based on an evaluation at runtime of the expression "x≤1?"

Figure 7:
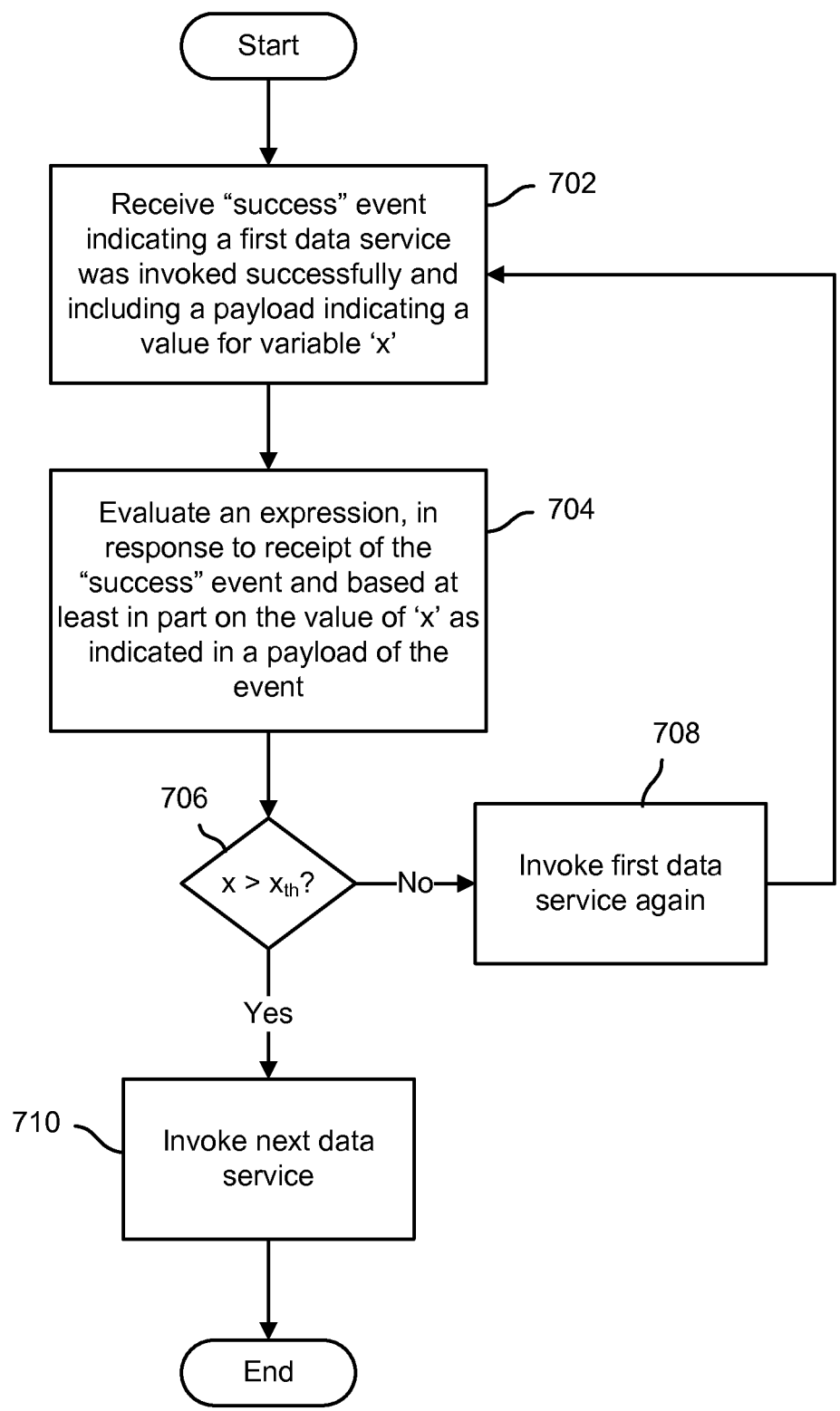
FIG. 7 is a flow chart illustrating an example embodiment of a process to perform expression based service execution chaining with dynamically determined looping.

FIG. 7 is a flow chart illustrating an example embodiment of a process to perform expression based service execution chaining with dynamically determined looping. In some embodiments, the process of FIG. 7 may be executed by a client system on which application code of a developer-composed application is running, such as clients 102, 104, and 106 of FIG. 1. In the example shown, a "success" event indicating that a first data service has been invoked successfully, and including a payload indicating that a value of an associated variable 'x' is received (702). An expression is evaluated, in response to receipt of the "success" event and based at least in part on the payload indicating the current value of x (704). In the example shown, the expression "x≤$x_{th}$?" is evaluated (706), but in other examples any expression defined by a developer may be evaluated. In this example, if the value of 'x' indicated in the event payload is not greater than the threshold value $x_{th}$ (706), the first data service is invoked again (708), and upon successful completion steps 702 and 704 are repeated. If, instead, the current value of 'x' is found to exceed the threshold $x_{th}$ (706), a next data service is invoked (710). In this example, execution may loop through successive iterations of invoking the first data service (e.g., 702, 704, 706, and 708) unless/until the current value of 'x' is determined to exceed the threshold $x_{th}$ (706). In other embodiments, expressions other than comparing the current value of a variable, such as 'x' in this example, to a threshold value may be used. For example, more complex expression defined by a developer may be used and may incorporate data values and/or other information determined dynamically at application runtime.

Using techniques disclosed herein, an application developer may define application user interface pages or other components configured to perform expression based data service execution chaining. By enabling the developer to define conditions under which a (further) data service is to be invoked, e.g., in response to successful invocation of a previously-invoked service, a flexible and dynamic application flow and experience may be provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of data service execution, comprising:
   receiving at application runtime an indication that a first data service has returned a result indicating the first data service has been invoked successfully;
   evaluating an expression, based at least in part on the result;
   in the event the result does not exceed a threshold, re-invoking the first data service; and
   in the event the result exceeds the threshold, publishing an event associated with successful invocation of the first data service and invoking a second data service determined dynamically at application runtime based at least in part on an outcome of the evaluation of the expression, wherein the second data service is invoked by an element configured to subscribe to the event.

2. The method of claim 1, wherein the indication comprises receipt of the result.

3. The method of claim 1, further comprising receiving via a developer user interface a definition that includes the expression.

4. The method of claim 3, further comprising generating programmatically, based at least in part on the definition, application code to evaluate the expression at application runtime.

5. The method of claim 1, wherein a data value comprising the result comprises an argument of the expression.

6. The method of claim 1, wherein the event is published by an element that invoked the first data service.

7. The method of claim 1, wherein the first data service and the second data service comprise a set of two or more data services the execution of which is performed sequentially, each of at least a subset of the two or more data services being invoked at least in part in response to evaluation of an expression associated with a prior data service in the chain.

8. The method of claim 1, wherein the first data service and the second data service are the same.

9. The method of claim 1, wherein said second data service is selected at application runtime from a plurality of available next data services based at least in part on the outcome of the evaluation of the expression.

10. The method of claim 1, further comprising evaluating a second expression at application runtime, based at least in part on the result, and invoking a third data service based at least in part on an outcome of the evaluation of the second expression.

11. A system to chain data service execution, comprising:
a communication interface; and
a processor coupled to the communication and configured to:
  receive at application runtime via the communication interface an indication that a first data service has returned a result indicating the first data service has been invoked successfully;
  evaluate an expression, based at least in part on the result;
  in the event the result does not exceed a threshold, re-invoking the first data service; and
  in the event the result exceeds the threshold, publish an event associated with successful invocation of the first data service and invoke a second data service determined dynamically at application runtime based at least in part on an outcome of the evaluation of the expression, wherein the second data service is invoked by an element configure to subscribe to the event.

12. The system of claim 11, wherein the communication interface comprises a network communication interface.

13. The system of claim 11, wherein the communication interface comprises an event bus.

14. The system of claim 11, wherein the indication comprises receipt of the result.

15. The system of claim 11, wherein a data value comprising the result comprises an argument of the expression.

16. The system of claim 11, further comprising a memory in which the expression is stored.

17. A computer program product to chain data service execution, the computer program product being embodied in a non-transitory computer readable storage medium and comprising computer instructions for:
  receiving at application runtime an indication that a first data service has returned a result indicating the first data service has been invoked successfully;
  evaluating an expression, based at least in part on the result;
  in the event the result does not exceed a threshold, re-invoking the first data service; and
  in the event the result exceeds the threshold, publishing an event associated with successful invocation of the first data service and invoking a second data service determined dynamically at runtime based at least in part on an outcome of the evaluation of the expression, wherein the second data service is invoked by an element configured to subscribe to the event.

* * * * *